US009620784B2

(12) United States Patent
Azami

(10) Patent No.: US 9,620,784 B2
(45) Date of Patent: Apr. 11, 2017

(54) NEGATIVE ELECTRODE INCLUDING PLATY GRAPHITE CONDUCTIVE ADDITIVE FOR LITHIUM ION BATTERY, AND LITHIUM ION BATTERY USING THE SAME

(75) Inventor: Takeshi Azami, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 164 days.

(21) Appl. No.: 14/118,338

(22) PCT Filed: May 15, 2012

(86) PCT No.: PCT/JP2012/062362
§ 371 (c)(1),
(2), (4) Date: Nov. 18, 2013

(87) PCT Pub. No.: WO2013/008524
PCT Pub. Date: Jan. 17, 2013

(65) Prior Publication Data
US 2014/0227601 A1    Aug. 14, 2014

(30) Foreign Application Priority Data
Jul. 14, 2011   (JP) .................................. 2011-155736

(51) Int. Cl.
*H01M 4/133* (2010.01)
*H01M 4/587* (2010.01)
(Continued)

(52) U.S. Cl.
CPC ........... *H01M 4/625* (2013.01); *H01M 4/133* (2013.01); *H01M 4/587* (2013.01); *H01M 4/621* (2013.01);
(Continued)

(58) Field of Classification Search
CPC .. H01M 4/133; H01M 4/587; H01M 10/0525; H01M 4/625; H01M 4/621
(Continued)

(56) References Cited

U.S. PATENT DOCUMENTS 5,601,951 A * 2/1997 Johnson et al. .............. 429/346
6,344,235 B1 * 2/2002 Iijima ................. H01M 4/0409
427/122
2004/0224232 A1 * 11/2004 Yamaguchi et al. .......... 429/232

FOREIGN PATENT DOCUMENTS

JP    11-154513 A    6/1999
JP    11-263612 A    9/1999
(Continued)

*Primary Examiner* — Sean P Cullen
(74) *Attorney, Agent, or Firm* — Sughrue Mion, PLLC

(57) ABSTRACT

The purpose of the present invention is to provide a lithium-ion battery that exhibits excellent long-term life properties, does not suffer from rapid capacity degradation, and exhibits excellent charging/discharging characteristics in low-temperature environments. The present invention is directed to a negative electrode for a lithium ion battery, which comprises a negative electrode active material containing a graphite or an amorphous carbon, conductive additives containing a graphite, and a binder; and a lithium ion battery comprising this negative electrode. The negative electrode is characterized in that the negative electrode active material has a spherical or massive shape; the conductive additives have a platy shape; and part of an edge surface of the conductive additives contacts a surface of the negative electrode active material.

10 Claims, 6 Drawing Sheets

(51) Int. Cl.
   *H01M 4/62*      (2006.01)
   *H01M 10/0525*   (2010.01)
   *H01M 4/02*      (2006.01)

(52) U.S. Cl.
   CPC .. *H01M 10/0525* (2013.01); *H01M 2004/021* (2013.01); *Y02T 10/7011* (2013.01)

(58) Field of Classification Search
   USPC .............................................. 429/231.8, 232
   See application file for complete search history.

(56) References Cited

FOREIGN PATENT DOCUMENTS

| | | |
|---|---:|---|
| JP | 11-312525 A | 11/1999 |
| JP | 2000-138062 A | 5/2000 |
| JP | 2000-226206 A | 8/2000 |
| JP | 2001-015168 A | 1/2001 |
| JP | 2002-246023 A | 8/2002 |
| JP | 2004-111109 A | 4/2004 |
| JP | 2004-319312 A | 11/2004 |
| JP | 2005-078935 A | 3/2005 |
| JP | 2005-142004 A | 6/2005 |
| JP | 2005-222933 A | 8/2005 |
| JP | 2008-016456 A | 1/2008 |
| JP | 2009-059713 A | 3/2009 |
| JP | 2012-084519 A | 4/2012 |
| JP | 2012-133981 A | 7/2012 |
| WO | 98/05083 A1 | 2/1998 |

\* cited by examiner

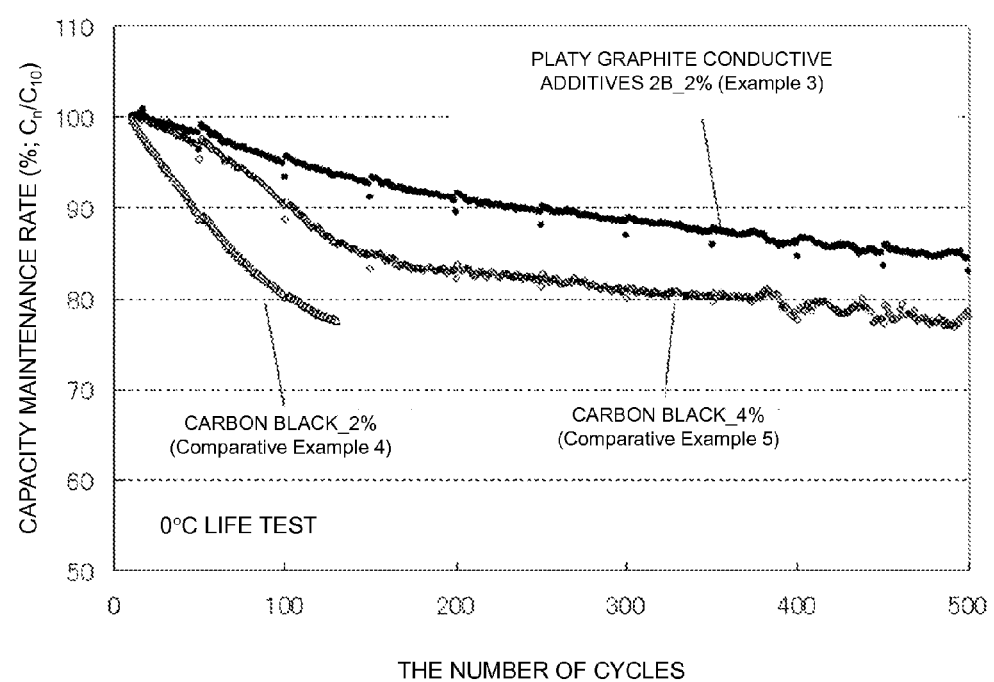

NEGATIVE ELECTRODE INCLUDING PLATY GRAPHITE CONDUCTIVE ADDITIVE FOR LITHIUM ION BATTERY, AND LITHIUM ION BATTERY USING THE SAME

CROSS REFERENCE TO RELATED APPLICATIONS

This is a National Stage of International Application No. PCT/JP2012/062362, filed May 15, 2012, claiming priority from Japanese Patent Application No. 2011-155736, filed Jul. 14, 2011, the contents of all of which are incorporated herein by reference in their entirety.

TECHNICAL FIELD

The present invention relates to a negative electrode for a lithium ion battery, and a lithium ion battery.

BACKGROUND ART

Lithium ion batteries are presently anticipated as a useful power source due to growing consciousness to environmental problems in the worldwide scale and for realization of the low-carbon society. For example, as high-capacity chargeable and dischargeable batteries for a power storage system, nonaqueous electrolyte solution-based lithium ion batteries using a large-sized laminate cell have been used practically. Lithium ion batteries are anticipated also as batteries for electric vehicles (EVs) and hybrid electric vehicles (HEVs). Particularly lithium ion batteries mounted on electric vehicles conceivably need long-term life properties over at least 10 years. Therefore, the lithium ion batteries are required to have a low capacity degradation rate to the number of times of charge and discharge, and further absolutely not to cause a rapid capacity degradation phenomenon, the so-called rapid fading phenomenon, while the vehicle is driven, in order to enhance the safety. The lithium ion batteries are also required to have a resistance as the whole battery as low as possible in order to be operated even in a low-temperature environment.

A lithium ion battery is usually constituted of a positive electrode, a negative electrode, an electrolyte, and a separator. As a positive electrode active material to be used for the positive electrode, lithium cobaltate (LiCoO$_2$), manganese spinel (LiMn$_2$O$_4$), and the like are mainly used. Since the positive electrode active material has a high electric resistance, the electric resistance of the positive electrode is decreased by using carbon-based conductive additives. As a binder, for example, styrene-butadiene rubber, fluororubber, synthetic rubber, a polymer such as polyvinylidene fluoride, an acryl resin, and the like are used.

A negative electrode active material to be used is natural graphite, artificial graphite obtained by thermally treating coal, petroleum pitch or the like at a high temperature, amorphous carbon obtained by thermally treating coal, petroleum pitch coke, acetylene pitch coke or the like, a lithium alloy such as metallic lithium or AlLi, or the like. Carbon-based conductive additives are used for a negative electrode in some cases for the purpose of decreasing the resistance.

As an electrolyte solution, a nonaqueous electrolyte solution in which an electrolyte such as a lithium salt is dissolved, is used. As the lithium salt, LiPF$_6$, LiBF$_4$, a lithium imide salt, LiClO$_4$, or the like are used. A separator is constituted of a film to separate a positive electrode and a negative electrode and prevent short-circuit of both the electrodes.

In lithium ion batteries having the above-mentioned constitutions, a technology using a spherical or massive carbon-based material as a negative electrode active material is described in Patent Literatures 1 and 2 (JP11-154513A and JP11-263612A). When a negative electrode active material is made in such a shape, a crystal orientation of the negative electrode active material is directed in various directions even after a rolling step for negative electrode fabrication. Thereby, lithium ions transfer smoothly between electrodes, and a lithium ion battery excellent in output properties can be made. In addition, there are many gaps are between the negative electrode active materials, and flow paths of an electrolyte solution are formed also in the direction perpendicular to the thickness direction of the negative electrode, thereby contributing smooth transfer of lithium ions. Therefore, in many lithium ion batteries for EVs and HEVs, as the negative electrode active material, a spherical or massive carbon-based material comes to be used.

However, on the other hand, if a negative electrode active material is made of a spherical or massive shape, the contact between the negative electrode active materials is liable to become point contact. Therefore, the electric resistance (electronic resistance) of a conductive network to carry electrons to a collector sometimes becomes high and sometimes become instable. Then, in order to reduce the electric resistance of a negative electrode, Patent Literature 3 (JP2005-142004A) discloses a technology of adding conductive additives of carbon blacks. Since carbon black is composed of primary particles of the order of several tens of nanometers, carbon black is easy to aggregate, and carbon black forms secondary particles and bridges between active materials; therefore, the carbon black is effective for securing the conductivity in the early charge and discharge cycle.

CITATION LIST

Patent Literature

Patent Literature 1: JP11-154513A
Patent Literature 2: JP11-263612A
Patent Literature 3: JP2005-142004

SUMMARY OF INVENTION

Technical Problem

However, the lithium ion battery using a spherical or massive carbon-based material as a negative electrode active material and raised in the conductivity by addition of carbon black as conductive additives as described above has problems as described below.

That is, in repetition of the charge and discharge cycle, the carbon black reacts with an electrolyte solution and the primary particles are gasified in some cases; and the carbon black vanishes due to etching and the conductive network of the secondary particles is disconnected in some cases. As a result, the rapid resistance rise and the capacity reduction of the lithium ion battery are caused in some cases.

SEI (Solid Electrolyte Interface) films formed on surfaces of a negative electrode active material and conductive additives greatly affect properties of the lithium ion battery. If a good-quality SEI film is not formed in the early charging time, part of the SEI film is broken during the charge and discharge cycle. Although an additive present in an electrolyte solution contributes to formation of an SEI film during the early stage of charging, the additive is not much left in the state that the charge and discharge cycle has been sufficiently repeated. Therefore, the electrolyte solution which intrinsically must not be decomposed is decomposed to resultantly form an SEI film, whose film quality is greatly degraded. As a result, the charge transfer resistance of the SEI film formed during the charge and discharge cycle increases, resulting in greatly degrading the output properties and the capacity properties. The degradation of the SEI film quality is remarkable in a low-temperature environment.

Since carbon materials having a not high degree of graphitization, such as carbon black, do not form so good SEI films in the early charging time, this tendency is remarkable. In addition, since carbon black enters gaps of an electrode active material so as to fill the gaps, the carbon black decreases spaces of the gaps to store an electrolyte solution. As a result, if the charge and discharge cycle is repeated, the electrolyte solution is liable to be depleted and the rapid capacity degradation phenomenon (rapid fading phenomenon) is liable to be caused.

From the above, conventional lithium ion batteries have problems in points including long-term life properties, suppression of rapid capacity degradation, operation in a low-temperature environment and the like, which are necessary for lithium ion batteries particularly for EVs and HEVs.

Then, an object of the present invention is to provide a lithium ion battery which is excellent in long-term life properties, does not cause the rapid capacity degradation, and is excellent in charge and discharge properties in a low-temperature environment.

Solution to Problem

One exemplary embodiment relates to:

a negative electrode for a lithium ion battery, comprising a negative electrode active material containing at least one of a graphite and an amorphous carbon, conductive additives containing a graphite, and a binder, wherein the negative electrode active material has a spherical or massive shape;

the conductive additives have a platy shape; and part of an edge surface of the conductive additives contacts a surface of the negative electrode active material.

Advantageous Effects of Invention

The present invention can provide a lithium ion battery which is excellent in long-term life properties, does not cause the rapid capacity degradation, and is excellent in charge and discharge properties in a low-temperature environment.

BRIEF DESCRIPTION OF DRAWINGS

FIG. 4 is a graph showing low-temperature (0° C.) life properties of lithium ion batteries of Example 3 and Comparative Examples 4 and 5.

DESCRIPTION OF EMBODIMENTS

Figure 1:
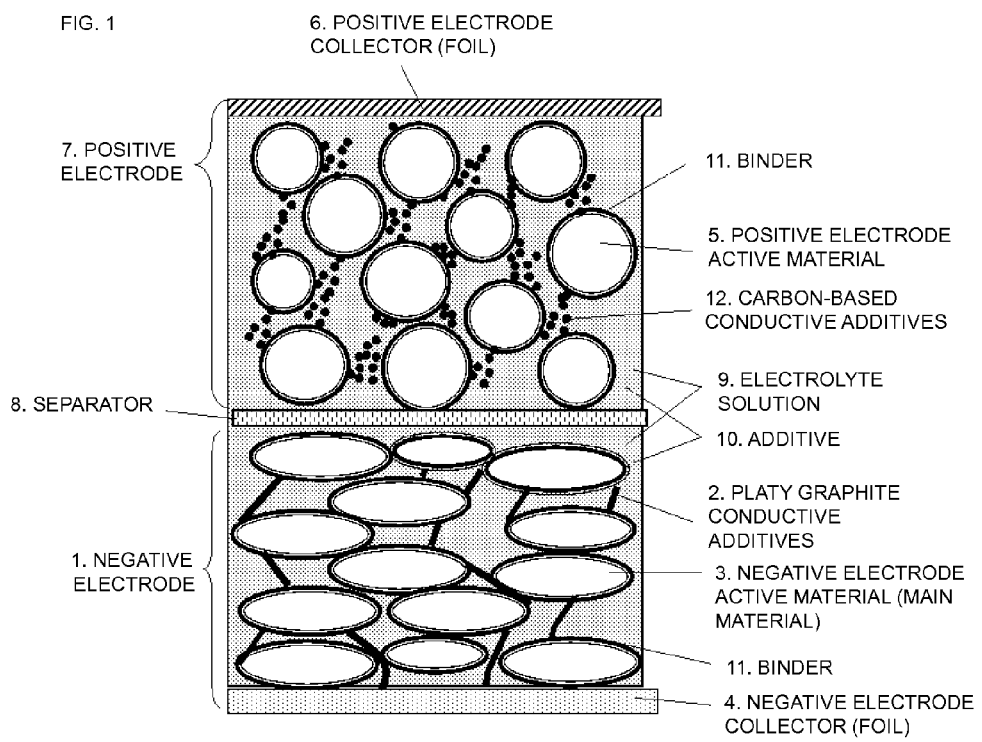
FIG. 1 is a schematic cross-sectional diagram to describe a structure of a lithium ion battery according to the present exemplary embodiment.

FIG. 1 shows a schematic cross-sectional diagram to describe a structure of a lithium ion battery according to one exemplary embodiment. In the lithium ion battery, a negative electrode 1 including a layer containing a negative electrode active material 3 on a negative electrode collector 4, and a positive electrode 7 including a layer containing a positive electrode active material 5 on a positive electrode collector 6 are laminated with a separator 8 interposed therebetween. The separator 8 is impregnated in an electrolyte solution 9. The negative electrode 1 of the lithium ion battery according to the present exemplary embodiment contains platy graphite conductive additives 2.

The negative electrode active material 3 is not especially limited as long as being graphite or amorphous carbon capable of occluding and releasing cations; and usable are natural graphite, crystalline artificial graphitized materials obtained by thermally treating coal, petroleum pitch or the like at a high temperature, amorphous carbon obtained by thermally treating coal, petroleum pitch coke, acetylene pitch coke or the like. If natural graphite is particularly used as the negative electrode active material 3, a large improving effect can be anticipated. Since natural graphite is more likely to have an orientation in a specific direction by pressing in electrode fabrication in comparison to artificial graphite, natural graphite has a concern about lithium ion-occluding and releasing properties; so, artificial graphite, which is highly costly, has conventionally been applied in the fields requiring the high performance and long life. In contrast, in the present exemplary embodiment, use of platy graphite conductive additives, which are homogeneously dispersed, can be anticipated to have a suppressing effect on the orientation in a specific direction of natural graphite. Therefore, the present exemplary embodiment allows application of natural graphite, which is relatively inexpensive, to fields (for example, vehicles or power storage systems) requiring the high performance and long life.

In addition, as the negative electrode active material 3, graphite whose surface is covered with amorphous carbon can also be used. In this case, an amorphous carbon layer has an action of retarding impregnatability of the electrolyte solution. Therefore, by securing flow paths of the electrolyte solution in gaps among the negative electrode active materials by using the platy graphite conductive additives, the properties of the lithium ion battery can be greatly improved.

In addition, the negative electrode active material 3 has a spherical or massive shape (i.e., a particulate shape). The reason is because that since the orientation of the crystal is directed in various directions also after a rolling step in electrode fabrication by using such a shape, the transfer of lithium ions between electrodes can be carried out smoothly. That is also because that since gaps through which the electrolyte solution flows among the negative electrode active materials are easily made, high output properties are excellent. A copper foil or the like can be used as the negative electrode collector 4.

In the above description, the case of using graphite as the negative electrode active material was described, but the negative electrode active material according to the present invention is not limited thereto. As the negative electrode active material, amorphous carbon such as hard carbon (hardly graphitized carbon) and soft carbon (easily graphitized carbon) may be used. In addition, graphite and amorphous carbon can be used concurrently.

That the negative electrode active material has a spherical or massive shape, and that the conductive additives have a platy shape can be confirmed by SEM (scanning electron microscope) observation. That is, in a SEM image of the negative electrode active material, in the case where (minor axis)/(major axis), which is a ratio of a length in the minor axis direction (a length in the direction giving the shortest length) to a length in the major axis direction (a length in the direction giving the longest length), is larger than 0.2, the negative electrode active material can be judged to have a spherical or massive shape. The (minor axis)/(major axis) of the negative electrode active material is preferably 0.3 or higher, and more preferably 0.5 or higher. In addition, in a SEM image of the conductive additives acquired similarly, in the case where the ratio (minor axis: a length in the c axis direction)/(major axis: a length in the a axis direction) is 0.2 or lower, the conductive additives are judged to have a platy shape. The (minor axis: a length in the c axis direction)/(major axis: a length in the a axis direction) of the conductive additives is preferably 0.1 or lower, and more preferably 0.05 or lower.

In observation of 50 particles of the conductive additives in a SEM image of the negative electrode, the case where part of ends in the major axis direction of the particles contacts with surfaces of the negative electrode active material, is judged as that "part of edge surface of conductive additives contact with a surface of a negative electrode active material". In the present exemplary embodiment, in a preferable state, in the case where 30 particles of the conductive additives are observed, part of ends in the major axis direction of the particles contacts with surfaces of the negative electrode active material; and in a more preferable state, in the case where 10 particles of the conductive additives are observed, part of ends in the major axis direction of the particles contacts with surfaces of the negative electrode active material.

Whereas the negative electrode active material of graphite contributes to charge and discharge of the lithium ion battery, and has a specific surface area smaller than 10 m$^2$/g, the conductive additives of graphite have different points in which the material improves the conductivity in the negative electrode, and has a specific surface area of 10 m$^2$/g or larger.

The positive electrode active material 5 is not especially limited as long as absorbing cations in the discharging time, and usable are metal oxides of lithium-transition metal composite oxides, for example, lithium-cobalt composite oxides ($LiCoO_2$, $LiCoAlO_2$, $LiCoMnO_2$ and the like), lithium-nickel composite oxides ($LiNiO_2$, $LiNiCoO_2$, $LiNiMnO_2$, $LiNiCoMnO_2$ and the like), lithium-manganese composite oxides ($LiMnO_2$, $LiMn_2O_4$, $LiMnMgO_4$, $Li_2MnO_3$ and the like), and olivine type phosphates ($LiFePO_4$ and the like). As the positive electrode collector 6, an aluminum foil or the like can be used.

The binder 11 is used in a layer containing the negative electrode active material in the negative electrode 1, and as the case may be, can be also used for a layer containing the positive electrode active material in the positive electrode 7. For example, in the negative electrode 1, the binder 11 adheres fellow particles of the negative electrode active material 3, the negative electrode active material 3 with the platy graphite conductive additive 2, and further the negative electrode active material 3 with the negative electrode collector 4. The binder is not especially limited, but suitable are polyvinylidene fluoride (PVDF), styrene-butadiene rubber (SBR), acrylic polymers and the like. For an organic binder, N-methyl-2-pyrrolidone (NMP) is best as a solvent. In addition, for an SBR-based aqueous binder, a thickener such as carboxymethyl cellulose (CMC) can be used. With respect to the amount of a binder, in case of a small amount thereof, a sufficient adhesion strength (peel strength) cannot be obtained; and in case of a too large amount thereof, since the binder inhibits free transfer-in and out of lithium ions, a charge transfer resistance increases and the battery capacity also decreases. The proportion of a binder with respect to a negative electrode mixture is preferably 1 mass % to 20 mass %, and more preferably 2 mass % to 10 mass %.

The platy graphite conductive additives 2 contact surfaces of the spherical or massive negative electrode active material 3 by parts of edge surfaces of the graphite conductive additives. Thereby, the electronic resistance of the negative electrode becomes low and the life properties of the battery can simultaneously be greatly improved. In the platy graphite conductive additives 2, the electric resistance in the a axis direction (a direction along a hexagonal network plane of carbon forming graphite; in a platy graphite, in the in-plane direction of the plate) of a graphite structure is lower by about three digits than that in the c axis direction (the thickness direction of stacking hexagonal network planes of carbon forming graphite; in the platy graphite, the direction perpendicular to the plate), providing the a axis direction with better conductivity. Therefore, if both end surfaces (edge surfaces) of the platy graphite conductive additives are made to contact surfaces of the negative electrode active material as shown in FIG. 1, the resistance of the negative electrode can be reduced mostly. In addition, SEI films are formed on the negative electrode active material and the conductive additives as well in the early charging time, but if the conductive additives contact the negative electrode active material by the edge surface of conductive additives, SEI films of contact portions become hardly broken in the charge and discharge cycle. The reason is conceivably because that since the thickness of the edges is thin, areas of contact portions are smaller than when the basal plane (a plane having the normal vector in the c axis direction) contacts therewith, and a force exerted on contact portions becomes small even if each particle expands and contracts along with charge and discharge to thereby suppress the mechanical breakage. In addition, the reason is conceivably because that since the conductive additives comprise graphite, an additive in the electrolyte solution is decomposed with the conductive additives as a starting point, and good-quality SEI films are formed also on surfaces of the negative electrode active material through contact portions to thereby form strong bonds. Breakage of SEI films is thus suppressed; thereby, good SEI films in the charging early stage are maintained and the life properties of the lithium ion battery can be greatly improved.

Conventional conductive additives whose primary particles are very small (in the order of several tens of nanometers), such as carbon black and Ketjen black, have high aggregatability, and make the slurry viscosity high and the gelation of the slurry easy in electrode fabrication in some cases, and make difficult the homogeneous dispersion thereof among negative electrode active materials in some cases. Therefore, although portions where the conductive additive aggregates have conductivity, places other than the portions have worsened conductivity, thus making unevenness in the conductive network. Additionally, although conductive networks formed by containing aggregation of such very small primary particles are effective for securing the conductivity in the cycle early stage, in repetition of the charge and discharge cycle, the conductive additives react with the electrolyte solution to thereby cause gasification of the primary particles by oxidation, and the conductive networks of secondary particles are disconnected by etching, thereby causing a rapid resistance rise and capacity reduction in some cases. Further, fine particles such as carbon black fill gaps among the negative electrode active materials in some cases.

In contrast, since the platy graphite conductive additives according to the present invention have a relatively large particle diameter, the conductive additives are excellent in homogeneous dispersibility, and conductive networks are scarcely disconnected even during the charge and discharge cycle, thereby suppressing a rapid resistance rise and capacity reduction. Additionally, the platy graphite conductive additives can make reasonable gaps among the spherical or massive negative electrode active materials. Therefore, electrolyte solution flow paths are easily formed not only to make easy the transfer of lithium ions but also to function as liquid reservoirs of the electrolyte solution. Therefore, depletion of the electrolyte solution during the charge and discharge cycle can be suppressed and the rapid capacity degradation can be suppressed.

That $D_{50s}/D_{50a}$, which is a ratio of an average particle diameter $D_{50s}$ of the negative electrode active material to an average particle diameter $D_{50a}$ of the platy graphite conductive additives, is 3 or higher and 10 or lower, thereby greatly improving properties of the lithium ion battery. In the case where $D_{50s}/D_{50a}$ is lower than 3, that is, in the case where the average particle diameter of the platy graphite conductive additives is large, the platy graphite conductive additives are likely to contact the negative electrode active material not by the edge surface of the platy graphite conductive additives but by the basal planes of the platy graphite conductive additives. That is, a state is liable to be made in which the negative electrode active material is divided by upper and lower basal planes of the platy graphite conductive additives. On the other hand, in the case where $D_{50s}/D_{50a}$ is higher than 10, that is, in the case where the average particle diameter of the platy graphite conductive additives is small, the platy graphite conductive additives are likely to contact particles of the negative electrode active material on basal planes of the conductive additives. The reason is because that since the platy graphite conductive additives are small, a state is liable to be made in which the platy graphite conductive additives just stick, on the basal planes, to surfaces of the negative electrode active material particles. In this state, since the platy graphite conductive additives do not connect the negative electrode active material particles with each other on the edge surfaces, not only the conductivity-improving effect is small, but also occlusion and release of lithium ions in and from the negative electrode active material particles is inhibited. Therefore, in order to contact part of edge surface of the platy graphite conductive additives with the negative electrode active material, platy graphite conductive additives having nearly the same size as the gaps between the negative electrode active materials are preferably selected; therefore, $D_{50s}/D_{50a}$ is preferably made to be 3 or higher and 10 or lower. The case of satisfying such an average particle diameter ratio can greatly improve battery properties as described before. The average particle diameter $D_{50s}$ of a negative electrode active material and the average particle diameter $D_{50a}$ of platy graphite conductive additives are determined from particle size distribution measurements in terms of volume by using a laser diffraction and scattering-type particle diameter and particle size distribution instrument to detect the particle diameter by laser light scattering.

The content of the platy graphite conductive additives in the negative electrode mixture is preferably made to be 2.0 mass % or higher and 10 mass % or lower. If the content of the platy graphite conductive additives is lower than 2.0 mass %, the number of the conductive additives intercalated among the negative electrode active materials is insufficient, and sufficient conductive networks cannot be formed, whereby the conductivity-improving effect cannot sufficiently be exhibited in some cases. On the other hand, if the content is higher than 10 mass %, since the conductive additives enter among the negative electrode active materials more than needed and gaps are resultantly formed, the cell thickness in the early stage of a lithium ion battery increases in some cases. Particularly in vehicular lithium ion batteries, since a plurality of lithium ion batteries are stacked and arranged in a limited accommodation space, it is considered to be necessary on design that an increase in the cell thickness due to the addition of conductive additives is made to be 10% or smaller. Therefore, making the content to be 10 mass % or lower can make the increasing ratio of the cell thickness to be 10% or lower.

The thickness of the platy graphite conductive additives is preferably 0.05 μm or larger and 0.5 μm or smaller. If the thickness of the platy graphite conductive additives is larger than 0.5 μm, since the edge surface of graphite of the platy graphite conductive additives increases, side-reactions with an electrolyte solution become extensive and gaps enhancing permeability of the electrolyte solution are clogged in some cases. On the other hand, if the thickness of the platy graphite conductive additives is smaller than 0.05 μm, the mechanical strength to pressing in electrode fabrication cannot be held in some cases. Here, the thickness of the platy graphite conductive additives can be calculated as an average thickness acquired by the SEM (scanning electron microscope) observation of 100 particles of the platy graphite conductive additives.

The specific surface area of the platy graphite conductive additives is preferably 10 $m^2/g$ or larger and 40 $m^2/g$ or smaller. If the specific surface area exceeds 40 $m^2/g$, since side reactions with the electrolyte solution become extensive, and gas is generated, the life properties of the battery are degraded in some cases. On the other hand, if the specific surface area is smaller than 10 $m^2/g$, the particle diameter of the platy graphite conductive additives becomes large and the efficient contact in gaps among the negative electrode active materials cannot be made in some cases. The specific surface areas of conductive additives according to related technologies are, for example, much as large as 800 $m^2/g$ to 1,300 $m^2/g$ for Ketjen black, and in the range of 50 $m^2/g$ to 100 $m^2/g$ for acetylene black and carbon black. Therefore, the specific surface areas of conductive additives according to related technologies are usually larger by 2 to 4 times than the specific surface area of the platy graphite conductive additives according to the present invention. Since the platy graphite conductive additives according to the present invention have a relatively small specific surface area and simultaneously has a platy particle shape, the conductive additives resultantly have very good properties as conductive additives.

The platy graphite conductive additives are preferably artificial graphite whose crystallinity has reasonably developed, but is not limited thereto. Even natural graphite-type platy graphite conductive additives are preferable as long as the natural graphite has crystallinity equal to that of artificial graphite. The crystallinity of the conductive additives surface can be evaluated by Raman spectroscopy. With respect to Raman bands of graphite, a G band (near 1,580 to 1,600 cm$^{-1}$) corresponding to the in-plane vibration mode and a D band (near 1,360 cm$^{-1}$) derived from in-plane defects are observed. With these peak intensities taken as $I_G$ and $I_D$ respectively, a higher peak intensity ratio $I_G/I_D$ means a higher degree of graphitization. In the Raman spectroscopic property of the platy graphite conductive additives, $I_G/I_D$ is preferably 6 or higher and 12 or lower. This Raman peak intensity ratio is a higher value than the Raman peak intensity ratio $I_G/I_D$=1.0 of carbon black. In the case where $I_G/I_D$ is a lower value than 6, the effect of forming the film on the electrode surface by an additive is worsened in some cases; and in the case where $I_G/I_D$ is a higher value than 12, the reactivity with the electrolyte solution rises and the life properties are worsened in some cases.

The physical properties of the platy graphite conductive additives depend on the burning temperature and the kind and pressure of atmosphere gas in the production time; and by varying production conditions, various types of platy graphite conductive additives can separately be fabricated. For example, in the case of using coal pitch as a raw material, the production method includes a method of mixing the coal pitch with petroleum pitch or coal tar pitch or the like, and burning the mixture at 2,000 to 3,000° C. Additionally platy graphite conductive additives with a covering having physical and chemical properties equal to those of artificial graphite can be obtained by thermally decomposing hydrocarbons, for example, benzene, xylene and the like, by a CVD method, and vapor-depositing the thermally decomposed hydrocarbons on the surface of a base material of natural graphite.

As a solvent for the electrolyte solution 9, usable are solvents having a high polarity utilizable as an electrolyte solution of the lithium ion battery, for example, ethylene carbonate, propylene carbonate, dimethyl carbonate, diethyl carbonate, methyl ethyl carbonate, γ-butyrolactone, N,N'-dimethylformamide, dimethyl sulfoxide, N-methylpyrrolidone and m-cresol. In addition, in the solvent, salts can be dissolved which are composed of cations of alkaline metals such as Li, K and Na and anions of compounds containing halogens, such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$ and $(C_2F_5SO_2)_3C^-$. In addition, a solvent composed of these basic solvents and an electrolyte salt may be also used singly or in combination of two or more. A gelatinous electrolyte in which an electrolyte solution is contained in a polymer gel may be used.

In the electrolyte solution, in order to stably maintain good-quality SEI films on the negative electrode surface, an additive 10 may further be added. The SEI films have functions of suppressing the reactivity (decomposition) with the electrolyte solution, carrying out the desolvation reaction along with intercalation and disintercalation of lithium ions, and suppressing the physical structural degradation of the negative electrode active material. Examples of the additive include vinylene carbonate (VC), propane sultone (PS) and cyclic disulfonate esters.

EXAMPLES

Example 1

92 parts by mass of a manganese spinel (LiMn$_2$O$_4$) powder having an average particle diameter of 10 μm as a positive electrode active material, 4 parts by mass of a binder, and 4 parts by mass of a carbon black as conductive additives were homogeneously dispersed in NMP to thereby fabricate a slurry for a positive electrode. As the binder, since use of any binder of a PVDF (polyvinylidene fluoride), an aqueous SBR binder and an acrylic binder could provide the effects of the present invention, the PVDF was used in the present Example. The reason of using the carbon black as conductive additives for the positive electrode was because the positive electrode did not exhibit volume expansion and contraction due to repetition of charge and discharge, which would be seen in a negative electrode, and the carbon black had a different potential. The reason was also because disappearance (gasification) of primary particles did not almost occur, and disconnection of the conductive network, which would be seen in the negative electrode, did not almost occur. The positive electrode was fabricated by uniformly applying the slurry for the positive electrode on an aluminum foil of 20 μm in thickness as a positive electrode collector by using a coater, and thereafter evaporating NMP. After the one surface of positive electrode collector was dried, a positive electrode was similarly fabricated on the rear surface of positive electrode collector to thereby make a double-sided coated electrode. After drying, the positive electrode density was regulated by a roll press. The amount of the positive electrode mixture per unit area was made to be 0.048 g/cm$^2$.

In NMP, 2 parts by mass of a platy artificial graphite 2A (average particle diameter (in terms of volume) $D_{50a}$=2.5 average plate thickness=0.05 specific surface area=20 m$^2$/g, and G/D ratio ($I_G/I_D$) by Raman spectroscopy=12) as conductive additives, 6 parts by mass of a binder, and 92 parts by mass of a massive natural graphite (a massive natural graphite covered with an amorphous carbon material on the surface thereof) were added to thereby fabricate a slurry for a negative electrode. As the binder, since use of any binder of a PVDF (polyvinylidene fluoride), an aqueous SBR binder and an acrylic binder could provide the effects of the present invention, the PVDF was used in the present Example. The negative electrode was fabricated by uniformly applying the slurry for the negative electrode on a copper foil of 10 μm in thickness as a negative electrode collector by using a coater, and thereafter evaporating NMP. After drying, the negative electrode density was regulated by a roll press. The amount of the negative electrode mixture after the drying was made to be 0.008 g/cm$^2$. The composition of the negative electrode mixture became 2 mass % of the platy artificial graphite 2A, 6 mass % of the PVDF, and 92 mass % of the massive natural graphite. In addition, $D_{50s}/D_{50a}$, which was a ratio of an average particle diameter $D_{50s}$ of the massive natural graphite to an average particle diameter $D_{50a}$ of the platy graphite conductive additives, was 6.5.

An electrolyte solution was used which was obtained by dissolving LiPF$_6$ of 1 mol/L as an electrolyte in ethylene carbonate (EC): diethyl carbonate (DEC)=30:70 (vol %) as a solvent, and mixing 2.0 mass % of a cyclic disulfonate ester (propylenemethanedisulfonate) as an additive.

A test was carried out by using a battery of a medium-sized laminate cell. Hereinafter, a fabrication method of the medium-sized laminate cell will be described. The above-mentioned positive electrode was cut into 8.0 cm×4.8 cm, and the above-mentioned negative electrode was cut into 9.0 cm×5.6 cm. Here, one side 8.0 cm×1.0 cm of the positive electrode and one side 9.0 cm×1.0 cm of the negative electrode were left as uncoated portions to be connected with tabs. An aluminum-made positive electrode tab of 7 mm width, 12 cm length and 0.1 mm thickness was welded to the uncoated portion of the positive electrode. As for the negative electrode, a nickel-made negative electrode tab having the same shape was similarly welded to the uncoated portion of the negative electrode. As a separator, polypropylene of 10 cm×7.0 cm was applied. The separators covered both the surfaces of the positive electrodes, and the negative electrode was disposed so as to face each of the positive electrodes from both surfaces to thereby fabricate an electrode laminate.

Then, the electrode laminate was interposed by two sheets of aluminum laminate films of 16 cm×10 cm; and three sides excluding one side of long sides were thermally sealed by a width of 8 mm; the electrolyte solution was injected; and thereafter, the residual one side was thermally sealed to thereby fabricate the medium-sized laminate cell battery.

Example 2

A battery was fabricated as in Example 1, except for using a composition of a negative electrode mixture of 4 mass % of the platy artificial graphite 2A as conductive additives, 6 mass % of the PVDF, and 90 mass % of the massive natural graphite (the same as in Example 1).

Example 3

A battery was fabricated as in Example 1, except for using a composition of a negative electrode mixture of 2 mass % of a platy artificial graphite 2B (average particle diameter $D_{50a}$=4.5 μm, plate thickness=0.5 μm, specific surface area=40 m$^2$/g, and G/D ratio ($I_G/I_D$) by Raman spectroscopy=6) as conductive additives, 6 mass % of the PVDF, and 92 mass % of a spherical natural graphite (a spherical natural graphite coated with an amorphous carbon on the surface, $D_{50s}/D_{50a}$=4.5).

Example 4

A battery was fabricated as in Example 1, except for using a composition of a negative electrode mixture of 4 mass % of the platy artificial graphite 2B as conductive additives, 6 mass % of the PVDF, and 90 mass % of the spherical natural graphite (the same as in Example 3).

Comparative Example 1

A battery was fabricated as in Example 1, except for using a composition of a negative electrode mixture of 2 mass % of the carbon black, 6 mass % of the PVDF, and 92 mass % of the massive natural graphite (the same as in Example 1).

Comparative Example 2

A battery was fabricated as in Example 1, except for using a composition of a negative electrode mixture of 4 mass % of the carbon black, 6 mass % of the PVDF, and 90 mass % of the massive natural graphite (the same as in Example 1).

Comparative Example 3

A battery was fabricated as in Example 1, except for using a composition of a negative electrode mixture of 6 mass % of the PVDF, and 94 mass % of the massive natural graphite (the same as in Example 1).

Comparative Example 4

A battery was fabricated as in Example 1, except for using a composition of a negative electrode mixture of 2 mass % of the carbon black, 6 mass % of the PVDF, and 92 mass % of the spherical natural graphite (the same as in Example 3).

Comparative Example 5

A battery was fabricated as in Example 1, except for using a composition of a negative electrode mixture of 4 mass % of the carbon black, 6 mass % of the PVDF, and 90 mass % of the spherical natural graphite (the same as in Example 3).

Comparative Example 6

A battery was fabricated as in Example 1, except for using a composition of a negative electrode mixture of 6 mass % of the PVDF, and 94 mass % of the spherical natural graphite (the same as in Example 3).

(Shapes of the Negative Electrode Active Material and the Conductive Additives, and Confirmation of the Contact State of the Negative Electrode Active Material and the Conductive Additives)

There were confirmed by the SEM (scanning electron microscope) observation that the negative electrode active materials of Examples 1 to 4 had a spherical or massive shape, that the conductive additives had a platy shape, and that part of edge surface of the conductive additives contacted with surfaces of the negative electrode active materials.

(Measurement of the Capacity Maintenance Rate in a High-Temperature Environment)

The capacity maintenance rates of the lithium ion batteries of Examples 1 to 4 and Comparative Examples 1 to 6, that is, the life properties, were measured. The measurement test was carried out in a cycle pattern repeating charge and discharge in a constant temperature bath. In the charging pattern, a 1C-constant current charging to a lithium ion battery was carried out until the voltage reached the upper limit voltage 4.2 V, and a 4.2 V-constant voltage charging was successively carried out, for a total time of charging of 2.5 hours. In the discharging, a 1C-constant current discharging was carried out until 2.5 V. The temperature of the constant temperature bath was set at as high a temperature as 55° C. so that the degradation of lithium ion batteries was accelerated to come out the differences in the battery property early.

Figure 2:
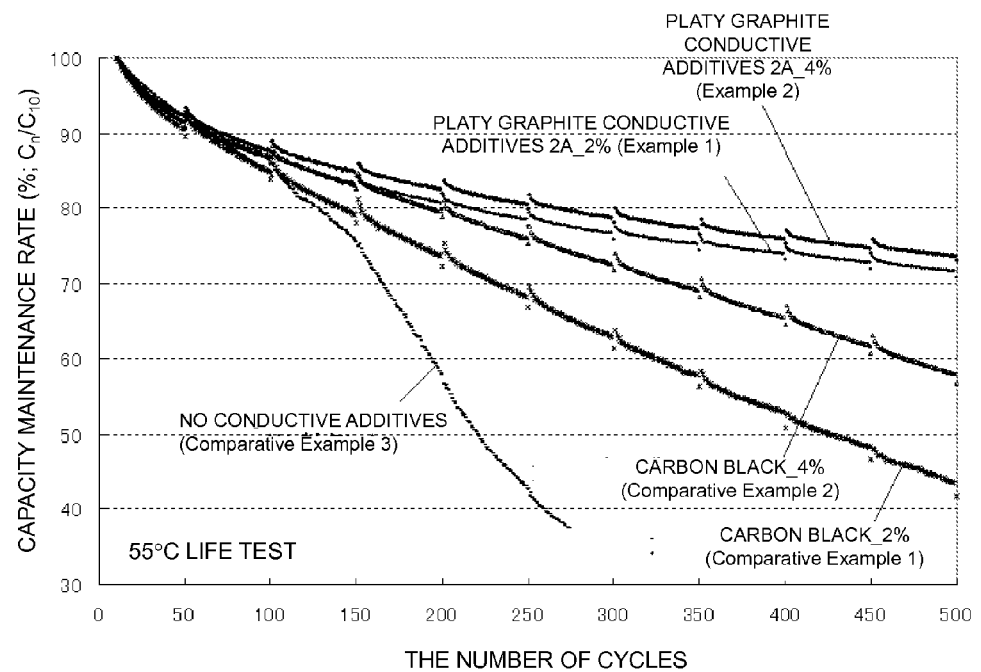
FIG. 2 is a graph showing high-temperature (55° C.) life properties of lithium ion batteries of Examples 1 and 2 and Comparative Examples 1 to 3.
Figure 3:
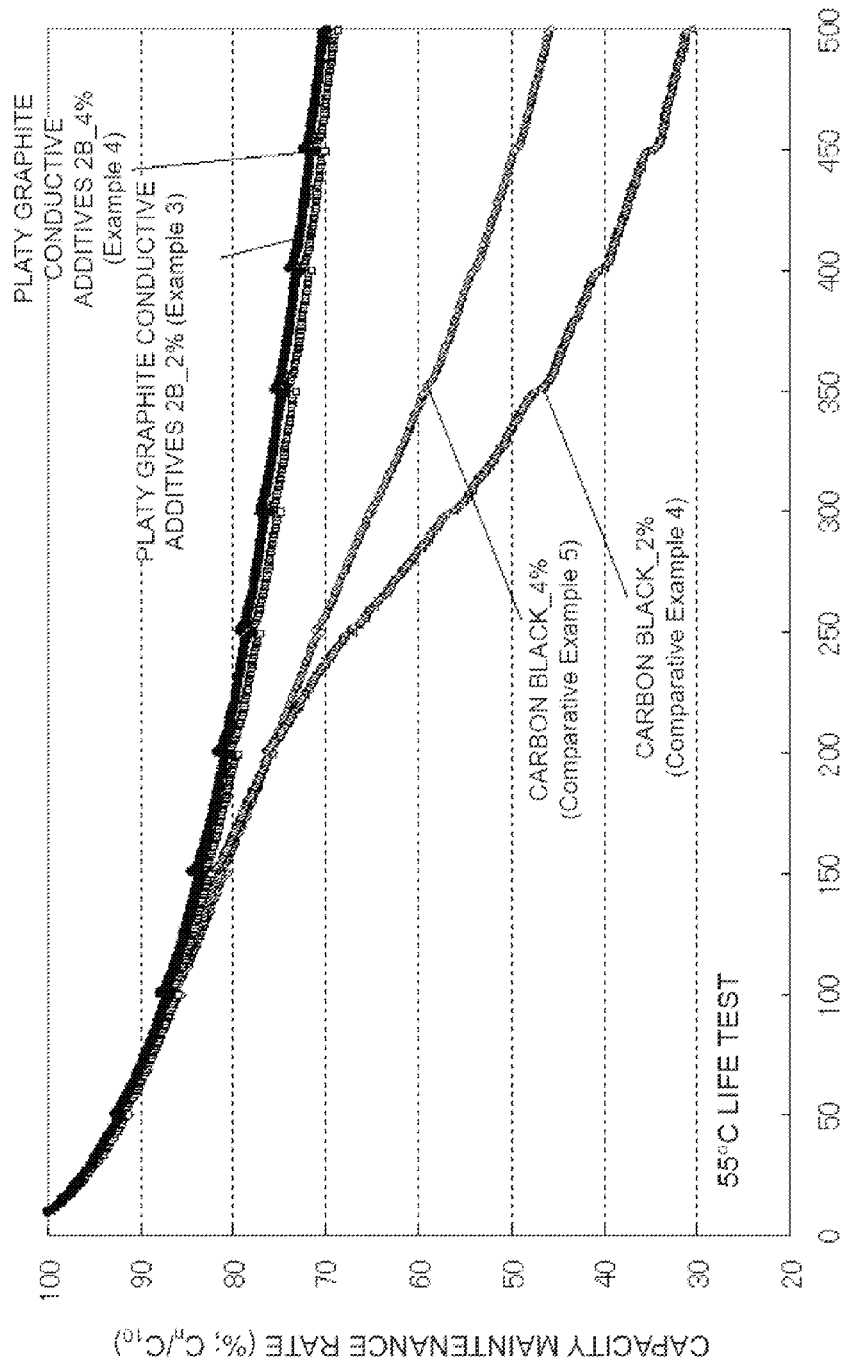
FIG. 3 is a graph showing high-temperature (55° C.) life properties of lithium ion batteries of Examples 3 and 4 and Comparative Examples 4 and 5.

FIGS. 2 and 3 are graphs showing comparative results of life properties at a high temperature (55° C.) of the respective lithium ion batteries. The capacity maintenance rate $C_n/C_{10}$ of the ordinates in FIGS. 2 and 3 is a value determined from (a discharge capacity at the n-th cycle/a charge capacity at 10th cycle)×100. In addition, properties of conductive additives in the negative electrodes of the respective lithium ion batteries are shown in Table 1; and constitutions of the negative electrodes of the respective lithium ion batteries, and measurement results of capacity maintenance rates after 500 cycles are shown in Table 2.

TABLE 1

| Kind of Conductive Additives | Size of Primary Particle | Distribution of Secondary Particle | Form of Particle | Specific Surface Area BET/N$_2$ (m$^2$/g) | Raman G/D Ratio ($I_G/I_D$) |
|---|---|---|---|---|---|
| Platy Artificial Graphite 2A | $D_{50a}$ = 2.5 μm plate thickness = 0.05 μm | not aggregated | platy | 20 | 12 |
| Platy | $D_{50a}$ = 4.5 μm | not | platy | 40 | 6 |

TABLE 1-continued

| Kind of Conductive Additives | Size of Primary Particle | Distribution of Secondary Particle | Form of Particle | Specific Surface Area BET/N$_2$ (m$^2$/g) | Raman G/D Ratio (I$_G$/I$_D$) |
|---|---|---|---|---|---|
| Artificial Graphite 2B Carbon Black | plate thickness = 0.5 μm average particle diameter = 40 nm | aggregated 5-100 μm | particulate | 60 | 1.0 |

The lithium ion battery in which 2 mass % of the platy artificial graphite 2A was added exhibited a capacity maintenance rate of about 71% after 500 cycles as shown in Example 1 in Table 2 and FIGS. 2 and 3. It is therefore found that Example 1 provided the life property better by 28% than Comparative Example 1 in which 2 mass % of the carbon black was added.

As shown in Example 2, the lithium ion battery in which 4 mass % of the platy artificial graphite 2A was added exhibited a capacity maintenance rate of 73%, which was higher than in Example 1, after 500 cycles. Additionally, example 2 provided the life property better by 17% than Comparative Example 2 in which 4 mass % of the carbon black was added.

In the lithium ion battery of Comparative Example 3 in which no conductive additives were added, rapid capacity degradation was observed nearly from the 100th cycle.

As shown in Example 3, the lithium ion battery in which 2 mass % of the platy artificial graphite 2B was added exhibited a capacity maintenance rate of about 69%, after 500 cycles.

As shown in Example 4, the lithium ion battery in which 4 mass % of the platy artificial graphite 2B was added exhibited a capacity maintenance rate of 70% after 500 cycles, which was nearly the same capacity maintenance rate as that of the case where 2 mass % of the platy artificial graphite 2B was added.

On the other hand, the capacity maintenance rates after 500 cycles of Comparative Example 4 and Comparative Example 5 in which the carbon black was added were as low as 31% and 45%, respectively.

In the case of Comparative Example 6 in which no conductive additives were added, rapid capacity degradation was observed.

It is found as shown in the above that the lithium ion batteries in which the platy artificial graphite 2A or 2B was

TABLE 2

| Sample | Kind of Negative Electrode Active Material | Kind of Platy Graphite Conductive Additives | Content of Platy Graphite Conductive Additives in Negative Electrode Mixture (mass %) | Content of Carbon Black in Negative Electrode Mixture (mass %) | Capacity Maintenance Rate at 55° C. After 500 Cycles (%) |
|---|---|---|---|---|---|
| Example 1 | massive natural graphite | platy artificial graphite 2A | 2 | 0 | 71 |
| Example 2 | massive natural graphite | platy artificial graphite 2A | 4 | 0 | 73 |
| Example 3 | spherical natural graphite | platy artificial graphite 2B | 2 | 0 | 69 |
| Example 4 | spherical natural graphite | platy artificial graphite 2B | 4 | 0 | 70 |
| Comparative Example 1 | massive natural graphite | none | 0 | 2 | 43 |
| Comparative Example 2 | massive natural graphite | none | 0 | 4 | 56 |
| Comparative Example 3 | massive natural graphite | none | 0 | 0 | unmeasurable due to rapid degradation |
| Comparative Example 4 | spherical natural graphite | none | 0 | 2 | 31 |
| Comparative Example 5 | spherical natural graphite | none | 0 | 4 | 45 |
| Comparative Example 6 | spherical natural graphite | none | 0 | 0 | unmeasurable due to rapid degradation | added caused no rapid capacity degradation, and maintained the good cycle property even after 500 cycles. In contrast, Comparative Examples in which the carbon black was added or no conductive additives were added caused a phenomenon that the capacity maintenance rate greatly decreased with cycles. The reason is conceivably because that in Comparative Examples, since the size of the primary particles was smaller than that of the platy graphite conductive additives, the repetition of cycles progressed oxidation and etching and the conductive network was partially interrupted. Thus causing no rapid capacity degradation is especially useful in large-sized lithium ion batteries for automobiles and the like.

(Measurement of the Capacity Maintenance Rate in a Low-Temperature Environment)

The lithium ion batteries fabricated in Example 3 and Comparative Examples 4 and 5 were subjected to a cycle test at a low-temperature environment of 0° C., and the capacity maintenance rates were measured. FIG. 4 is a graph showing comparative results of life properties at a low temperature (0° C.) of the respective lithium ion batteries. The capacity maintenance rate $C_n/C_{10}$ of the ordinate is the same as in FIG. 2. Additionally, constitutions of the negative electrodes of the respective lithium ion batteries and measurement results of the capacity maintenance rates after 500 cycles are shown in Table 3.

TABLE 3

| Sample | Kind of Negative Electrode Active Material | Kind of Platy Graphite Conductive Additives | Content of Platy Graphite Conductive Additives in Negative Electrode Mixture (mass %) | Content of Carbon Black in Negative Electrode Mixture (mass %) | Capacity Maintenance Rate at 0° C. After 500 Cycles (%) |
|---|---|---|---|---|---|
| Example 3 | spherical natural graphite | platy artificial graphite 2B | 2 | 0 | 85 |
| Comparative Example 4 | spherical natural graphite | none | 0 | 2 | unmeasurable due to rapid degradation |
| Comparative Example 5 | spherical natural graphite | none | 0 | 4 | 77 |

It is found as shown in Example 3 in Table 3 and FIG. 4 that Example 3 could carry out charge and discharge without degrading the capacity even at a low temperature of 0° C., and exhibited a high capacity maintenance rate of 85% even after 500 cycles. In contrast, it is found that Comparative Example 4 caused rapid degradation, so-called rapid fading phenomenon, from the cycle early stage. In Comparative Example 5, it is found that the capacity degradation became gradually large beyond around the 50th cycle, and the capacity maintenance rate after 500 cycles was as low as about 77%. Additionally, it is also found in Comparative Example 5 that the degradation rate vigorously varied beyond around the 400th cycle, which was repetition of instable charge and discharge.

It is thus found that the lithium ion batteries using the platy artificial graphite 2B exhibited much better charge and discharge properties at a low temperature than the lithium ion batteries using the carbon black as the conductive additives. Such properties are very useful in batteries for vehicles and the like whose daily usage is assumed in cold areas.

(Measurement of the Impedance Property)

The impedance properties of the lithium ion batteries fabricated in Examples 3 and 4 and Comparative Examples 4 and 5 were evaluated using cole-cole plots. The evaluation of the impedance properties was carried out by the alternating impedance method using a measurement instrument made by Solartron Group Ltd. The measurement frequency range included a maximum frequency of 100 kHz and a minimum frequency of 10 mHz.

Figure 5A:
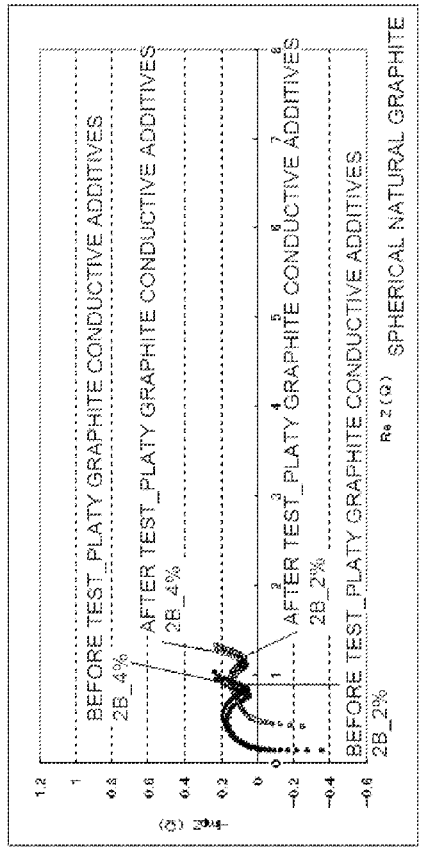
FIG. 5 is a graph showing impedance properties of lithium ion batteries of Examples 3 and 4 and Comparative Examples 4 and 5.
Figure 5B:
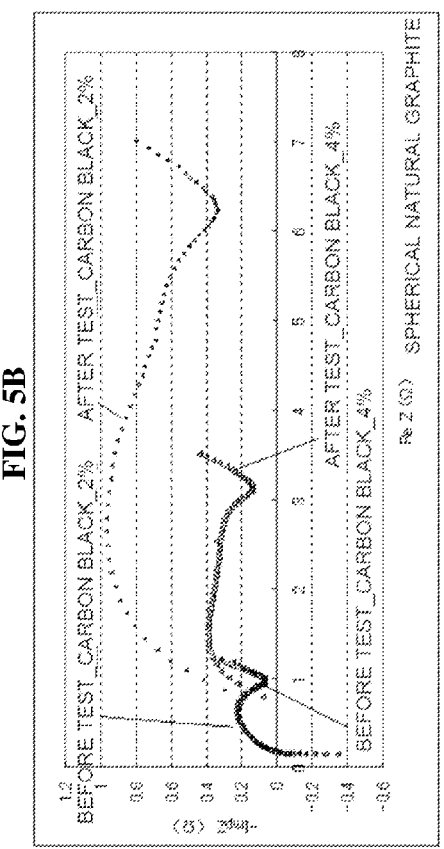

Cole-cole plots of Examples 3 and 4 are shown in FIG. 5A; and cole-cole plots of Comparative Examples 4 and 5 are shown in FIG. 5B. In FIGS. 5A and 5B, values of points where impedance curves intersect the real number axis (abscissa) correspond to electronic resistances in the lithium ion batteries. Specifically, the value is the sum total (for the positive electrode and negative electrode together) of an electronic resistance of the collector tab, an electronic resistance of the collector foil, an electronic resistance of the conductive path of the conductive additives from the collector foil to the active material, and the like. Therefore, by measuring the value, the influence of the conductive additives on the electric resistance can be evaluated.

Before the cycle test, when the electronic resistances of the batteries using the platy artificial graphite 2B (Examples 3 and 4) was compared with the batteries using the carbon black (Comparative Examples 4 and 5), there were no large differences observed between both the batteries. However, it is found that after the cycle test, although the electronic resistances of both of the batteries increased, particularly the electronic resistances of the batteries of Comparative Examples 4 and 5 greatly increased. Comparing increasing rates of electronic resistances of the respective batteries before and after the cycle test, the increasing rates of the batteries of Examples 3 and 4 exhibited increasing rates nearly below half of those of the batteries of Comparative Examples 4 and 5, so it is found that the addition of the platy graphite conductive additives suppressed the rise of the electronic resistance. It is conceivable that this is because in use of the carbon black whose primary particle size was smaller than that of the platy graphite conductive additives, the repetition of cycles progressed oxidation and etching and the conductive network was liable to be partially interrupted.

The impedance curves depict upward convex semicircular arcs in regions on the right side of points where the cole-cole plots intersect the abscissa. The diameters of the arcs correspond to the reaction resistances (charge transfer resistances) on the electrode surfaces. Specifically, the diameters indicate resistances when lithium ions pass through the electrolyte solution-active material interface, and the resistances are influenced by the state of the SEI and the specific surface area of the active material.

The arc reflects the reaction resistances of both the positive electrode and the negative electrode; and there are present two arcs (two or more arcs if there are a plurality of reactions related to charge transfer, as in a composite material system or the like) originated from both the reactions in some cases. Since the reaction resistance is a component originated from the reaction of the electrode, the reaction resistance was presumed not to be greatly influenced by change of the kind of the conductive additives, but actually, the addition of the platy graphite conductive additives greatly changed the reaction resistance. Particularly according to comparison after the cycle test, whereas in the batteries of Comparative Examples 4 and 5, the reaction resistance became large to a large extent, the batteries of Examples 3 and 4 exhibited almost no increase in the reaction resistance. It is conceivable that the reason is because in the case of using the carbon black, an SEI film having a film quality different from an SEI formed before the cycle test was formed on the surface of the electrode active material during the cycle test. It is conceivable from this that the addition of the platy graphite conductive additives in the negative electrode formed a good-quality and strong SEI film having a low reaction resistance not only on the surfaces of the platy graphite conductive additives but also on the surface of the negative electrode active material before the cycle test, and breakage of the SEI film during the cycle test was suppressed. As a result, it is presumed that the rise in the reaction resistance due to the formation of a new SEI film was suppressed and not only high-temperature properties but also the cycle properties at a low temperature were improved.

Figure 6:
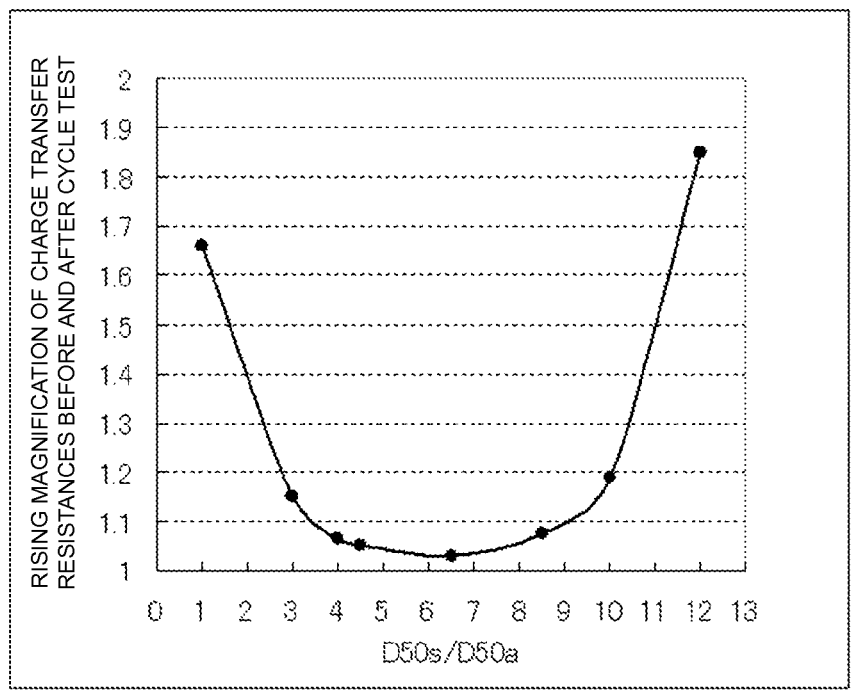
FIG. 6 is a graph showing a relationship between D50s/D50a and the rising magnification of charge transfer resistances before and after a cycle test.

Then, batteries whose $D_{50s}/D_{50a}$ were varied were fabricated, and the rising magnification of the charge transfer resistances before and after the cycle test were measured from their cole-cole plots; thereby, a proper range of $D_{50s}/D_{50a}$ was studied. FIG. 6 shows a graph where $D_{50s}/D_{50a}$ was plotted as the abscissa against the rising magnification of the charge transfer resistances before and after the cycle test as the ordinate. It is found from FIG. 6 that when $D_{50s}/D_{50a}$ was lower than 3 and higher than 10, the charge transfer resistance rose by the cycle test and the property degraded. When $D_{50s}/D_{50a}$ was lower than 3, this is conceivably because that since the platy graphite conductive additive particles were too large with respect to the negative electrode active material, it became difficult for the platy graphite conductive additives to contact the negative electrode active material by the edge surface of the graphite conductive additives; and the number of the graphite conductive additives contacting the negative electrode active material by the edge surface became small, and the graphite conductive additives contacted mainly by basal surfaces thereof. In addition, when $D_{50s}/D_{50a}$ was higher than 10, this is conceivably because that since the platy graphite conductive additive particles were too small with respect to the negative electrode active material, it became difficult for the platy graphite conductive additives to contact the negative electrode active material particle by the edge surface of the graphite conductive additives; therefore, the number of the graphite conductive additives contacting the negative electrode active material by the edge surface became small. If the number of the platy graphite conductive additives contacting the negative electrode active material by the edge surface is small, SEI films are broken during the cycle test; and while the electrolyte solution is decomposed in order to repair the breakage, SEI films having a degraded film quality are resultantly formed. Therefore, it is conceivable that the charge transfer resistance increased. It has been thus found from FIG. 6 that a preferable range of $D_{50s}/D_{50a}$ is 3 or higher and 10 or lower, and a more preferable range thereof is 4.5 or higher and 8.5 or lower.

Example 5

A battery was fabricated as in Example 1, except for using a composition of a negative electrode mixture of 2 mass % of the platy artificial graphite 2A, 6 mass % of the PVDF, and 92 mass % of a massive hard carbon (average particle diameter $D_{50s}=10$ μm, $D_{50s}/D_{50a}=4$) being an amorphous carbon.

Example 6

A battery was fabricated as in Example 1, except for using a composition of a negative electrode mixture of 4 mass % of the platy artificial graphite 2A, 6 mass % of the PVDF, and 90 mass % of the massive hard carbon (the same as in Example 5) being an amorphous carbon.

Comparative Example 7

A battery was fabricated as in Example 1, except for using a composition of a negative electrode mixture of 2 mass % of the carbon black, 6 mass % of the PVDF, and 92 mass % of the massive hard carbon (the same as in Example 5) being an amorphous carbon.

(Shapes of the Negative Electrode Active Material and the Conductive Additives, and Confirmation of the Contact State of the Negative Electrode Active Material and the Conductive Additives)

There were confirmed by the SEM (scanning electron microscope) observation that the negative electrode active materials of Examples 5 and 6 had a spherical or massive shape, that the conductive additives had a platy shape, and that part of edge surface of the conductive additives contacted with surfaces of the negative electrode active materials.

Constitutions of the negative electrodes of the respective lithium ion batteries, and measurement results of capacity maintenance rates after 500 cycles are shown in Table 4.

TABLE 4

| Sample | Kind of Negative Electrode Active Material | Kind of Platy Graphite Conductive Additives | Content of Platy Graphite Conductive Additives in Negative Electrode Mixture (mass %) | Content of Carbon Black in Negative Electrode Mixture (mass %) | Capacity Maintenance Rate at 55° C. After 500 Cycles (%) |
|---|---|---|---|---|---|
| Example 5 | massive hard carbon | platy artificial graphite 2A | 2 | 0 | 82 |
| Example 6 | massive hard carbon | platy artificial graphite 2A | 4 | 0 | 85 |
| Comparative Example 7 | massive hard carbon | none | 0 | 2 | 75 |

As shown in Table 4, it is found that even in the case of using the massive hard carbon for the negative electrode active material, the addition of 2 mass % or 4 mass % of the platy graphite conductive additives improved the capacity maintenance rate. It is conceivable that the reason is due to a large effect of decreasing the reaction resistance of the lithium ion batteries and suppressing the rise of the resistance.

As described in the above Examples, the present invention can provide a lithium ion battery having an elongated life, having a low reaction resistance, and being excellent in low-temperature properties by use of the platy graphite conductive additives in the negative electrode.

The present invention has been described by way of exemplary embodiments and Examples, but the present invention is not limited thereto, and various modifications may be made. For example, in the above exemplary embodiments and Examples, descriptions have been made by citing laminate-type large-sized lithium ion batteries as an example; however, the present invention can apply to batteries of a cylindrical type, a coin type, a card type, a flat type, an ellipse type, a square type, a button type and the like.

The present application claims the priority based on Japanese Patent Application No. 2011-155736, filed on Jul. 14, 2011, the disclosure of which is incorporated herein in its entirety.

REFERENCE SIGNS LIST

1 NEGATIVE ELECTRODE
2 PLATY GRAPHITE CONDUCTIVE ADDITIVES
3 NEGATIVE ELECTRODE ACTIVE MATERIAL
4 NEGATIVE ELECTRODE COLLECTOR
5 POSITIVE ELECTRODE ACTIVE MATERIAL
6 POSITIVE ELECTRODE COLLECTOR

7 POSITIVE ELECTRODE
8 SEPARATOR
9 ELECTROLYTE SOLUTION
10 ADDITIVE
11 BINDER
12 CARBON-BASED CONDUCTIVE ADDITIVES

The invention claimed is:

1. A negative electrode for a lithium ion battery, comprising a negative electrode active material containing at least one of a graphite and an amorphous carbon, a conductive additive, and a binder,
   wherein the negative electrode active material has a particulate shape;
   the conductive additive comprises a platy graphite with a Raman peak intensity ratio $I_G/I_D$ of 6-12, wherein the $I_G$ is an intensity of a peak in a G band in the vicinity of 1,580 cm$^{-1}$ to 1,600 cm$^{-1}$ corresponding to the in-plane vibration mode and the $I_D$ is an intensity of a peak in a D band in the vicinity of 1360 cm$^{-1}$ derived from in-plane defects; and
   at least a part of an edge surface of the conductive additives contacts a surface of the negative electrode active material; and
   wherein $D_{50s}/D_{50a}$, being a ratio of an average particle diameter $D_{50s}$ of the negative electrode active material to an average particle diameter $D_{50a}$ of the conductive additive, is 3 or higher and 10 or lower.

2. The negative electrode for a lithium ion battery according to claim 1, wherein a content of the conductive additive in a negative electrode mixture of the negative electrode for the lithium ion battery is 2.0 mass % or higher and 10 mass % or lower.

3. The negative electrode for a lithium ion battery according to claim 1, wherein a thickness of the conductive additives is 0.05 μm or larger and 0.5 μm or smaller.

4. The negative electrode for a lithium ion battery according to claim 1, wherein a specific surface area of the conductive additive is 10 m$^2$/g or larger and 40 m$^2$/g or smaller.

5. The negative electrode for a lithium ion battery according to claim 4, wherein the specific surface area of the conductive additive is 20 m$^2$/g or larger and 40 m$^2$/g or smaller.

6. A lithium ion battery, comprising a positive electrode, a negative electrode and a nonaqueous electrolyte solution, wherein the negative electrode is the negative electrode for the lithium ion battery according to claim 1.

7. A negative electrode for a lithium ion battery, comprising a negative electrode active material containing at least one of a graphite and an amorphous carbon, a conductive additive, and a binder, wherein the negative electrode active material has a particulate shape;
   the conductive additive comprises a platy graphite with a Raman peak intensity ratio $I_G/I_D$ of 6-12, wherein the $I_G$ is an intensity of a peak in a G band in the vicinity of 1,580 cm$^{-1}$ to 1,600 cm$^{-1}$ corresponding to the in-plane vibration mode and the $I_D$ is an intensity of a peak in a D band in the vicinity of 1360 cm$^{-1}$ derived from in-plane defects;
   at least a part of an edge surface of the conductive additive contacts a surface of the negative electrode active material, and
   a content of the conductive additive in a negative electrode mixture of the negative electrode for the lithium ion battery is 2.0 mass % or higher and 10 mass % or lower.

8. The negative electrode for a lithium ion battery according to claim 7, wherein a specific surface area of the conductive additive is 10 m$^2$/g or larger and 40 m$^2$/g or smaller.

9. The negative electrode for a lithium ion battery according to claim 8, wherein the specific surface area of the conductive additive is 20 m$^2$/g or larger and 40 m$^2$/g or smaller.

10. A lithium ion battery, comprising a positive electrode, a negative electrode and a nonaqueous electrolyte solution, wherein the negative electrode is the negative electrode for the lithium ion battery according to claim 7.

* * * * *